US012378043B2

(12) United States Patent
Jenkins et al.

(10) Patent No.: US 12,378,043 B2
(45) Date of Patent: Aug. 5, 2025

(54) ADHESIVE SEALANT DISCHARGE CAP FOR HANDHELD ADHESIVE SEALANT TUBES

(71) Applicants: Richard William Jenkins, Dallas, GA (US); Johnny Lynn Jenkins, Dallas, GA (US)

(72) Inventors: Richard William Jenkins, Dallas, GA (US); Johnny Lynn Jenkins, Dallas, GA (US)

(*) Notice: Subject to any disclaimer, the term of this patent is extended or adjusted under 35 U.S.C. 154(b) by 0 days.

(21) Appl. No.: 17/803,185

(22) Filed: Oct. 6, 2022

(65) Prior Publication Data

US 2024/0116681 A1 Apr. 11, 2024

Related U.S. Application Data

(60) Provisional application No. 63/253,002, filed on Oct. 6, 2021.

(51) Int. Cl.
*B65D 47/06* (2006.01)
*B05C 17/005* (2006.01)

(52) U.S. Cl.
CPC ........ *B65D 47/06* (2013.01); *B05C 17/00596* (2013.01); *B65D 2547/066* (2013.01)

(58) Field of Classification Search
CPC .............. B05C 17/00595; B65D 47/06; B65D 2547/066; B65D 47/123; B65D 51/222
USPC ...................................................... 222/80, 81
See application file for complete search history.

(56) References Cited

U.S. PATENT DOCUMENTS 6,193,108 B1 * 2/2001 Lepsius ............. B05C 17/00586 222/83
6,293,431 B1 * 9/2001 Seymour .............. B65D 51/226 222/91
2020/0399032 A1 * 12/2020 Chan .................... B65D 47/128
2021/0163191 A1 * 6/2021 Nojiri .................... B65D 51/18

* cited by examiner

*Primary Examiner* — Donnell A Long
(74) *Attorney, Agent, or Firm* — Johnson | Dalal; Mark C. Johnson

(57) ABSTRACT

An adhesive discharge cap for handheld adhesive sealant tubes that includes a cap body having an outer sidewall with an upper terminal end, a lower terminal end defining a lower opening and an outer surface and an inner surface defining a threaded coupling configuration surrounding the inner surface of the outer sidewall. The cap includes a sealant discharge conduit coupled to the cap body, with a lower terminal conduit end defining a lower conduit opening, an upper terminal conduit end defining an upper conduit opening, a conduit inner surface defining a conduit channel from upper to lower end of the conduit, with a conduit outer surface and defining, with the inner surface of the cap body, and a tube receiving channel surrounding the sealant discharge conduit, wherein the lower terminal conduit end is spatially offset a length below the lower terminal end of the cap body and the upper terminal conduit end spatially offset a length above the upper terminal end of the cap body.

16 Claims, 6 Drawing Sheets

2-2

ADHESIVE SEALANT DISCHARGE CAP FOR HANDHELD ADHESIVE SEALANT TUBES

FIELD OF THE INVENTION

The present invention relates generally to caps or covers for adhesive sealant tubes and, more particularly, relates to caps or covers operably configured to couple with adhesive sealant tubes and discharge the adhesive sealant through the cap.

BACKGROUND OF THE INVENTION

Adhesive silicone is widely used by many users throughout the world for many different purposes, including providing sealing for windshields, sunroofs, doors, lights, hose connections, and many more applications. Typically, adhesive silicone is room temperature vulcanized and commercially sold to users in a flexible tubes configured to be depressed to squeeze out the silicone or in cartridges that are configured to be utilized with an external ratcheting assembly, similar to a caulk gun. The container utilized to house the adhesive silicone is also typically sold with a nozzle to effectuate removal and application of the adhesive silicone from the container in which it is housed.

Whether utilizing tubes, cartridges, or other containers, many users experience the unfortunate problem of having unused silicone housed in the container cure and become unusable after initial use. To prevent or inhibit said issues, some known devices permit the user to recouple the original cap with the tube or container or provide the user with a secondary cap or cover operably configured to couple with and cover the opening on the nozzle. However, the sealant adhesive located proximal to the opening of the tube still routinely cures, rendering the product unusable or impractical for use by many users.

Therefore, a need exists to overcome the problems with the prior art as discussed above.

SUMMARY OF THE INVENTION

The invention provides an adhesive sealant discharge cap for handheld adhesive sealant tubes that overcomes the hereinafore-mentioned disadvantages of the heretofore-known devices and methods of this general type and that enables the adhesive sealant tube to be effectively and efficiently utilized repeatedly after initial use.

With the foregoing and other objects in view, there is provided, in accordance with the invention, an adhesive discharge cap for handheld adhesive sealant tubes that includes a cap body having an outer sidewall with an upper terminal end, a lower terminal end opposing the upper terminal end and defining a lower opening, a cap body length separating the upper and lower terminal ends of the cap body, and an outer surface and an inner surface defining a threaded coupling configuration surrounding the inner surface of the outer sidewall. Further, the discharge cap includes a sealant discharge conduit coupled to the cap body, with a lower terminal conduit end defining a lower conduit opening, an upper terminal conduit end opposing the lower terminal conduit end and defining an upper conduit opening, a conduit length separating the lower terminal conduit end and the upper terminal conduit end, with a conduit inner surface defining a conduit channel spanning the conduit length, with a conduit outer surface opposing the conduit inner surface and defining, with the inner surface of the cap body, and a tube receiving channel surrounding the sealant discharge conduit and spanning along the cap body length from the lower opening of the cap body to an internal wall disposed within the cap body, wherein the lower terminal conduit end is spatially offset a length below the lower terminal end of the cap body and the upper terminal conduit end spatially offset a length above the upper terminal end of the cap body.

In accordance with another feature, an embodiment of the present invention includes the outer surface having a plurality of ridges radially extending the outer surface of the outer sidewall and configured to provide a gripping surface for a user.

In accordance with a further feature of the present invention, wherein the cap body and the discharge conduit are of a monolithic structure.

In accordance with yet another feature of the present invention, the sealant discharge conduit tapers in diameter proximal to the lower terminal tube end.

In accordance with another feature of the present invention, the cap body and the sealant discharge conduit are of a polymeric material including at least one of polypropylene, polyethylene, ABS plastic, or nylon.

In accordance with an additional feature of the present invention, at least 10% of the conduit length is spatially offset a length below the lower terminal end of the cap body and at least 10% of the conduit length is spatially offset a length above the upper terminal end of the cap body.

In accordance with a further feature of the present invention, the lower terminal end of the cap body defines a lower cap plane, wherein the sealant discharge conduit oriented at a perpendicular angle relative to the lower cap plane and extending 5-25 mm in length below the lower terminal end of the cap body.

In accordance with another feature, an embodiment of the present invention also includes the sealant discharge conduit having a flange radially extending outwardly from the conduit outer surface, directly coupled with the inner surface of the cap body, and defining the internal wall defining an internal inner limit of the tube receiving channel.

In accordance with a further feature of the present invention, the flange is threadedly coupled to the threaded coupling configuration defined by the inner surface of the cap body.

Also in accordance with the present invention, a discharge cap is utilized in an improved combination with a handheld adhesive sealant tube operably configured to house an adhesive sealant within an enclosed tube cavity defined by the handheld adhesive sealant tube, having an upper end defining a tube opening for discharging the adhesive sealant, and defining a threaded configuration proximal to the upper end of the upper end of the handheld silicone adhesive sealant tube. The improvement includes a cap body having an outer sidewall with an upper terminal end, with a lower terminal end opposing the upper terminal end and defining a lower opening, with a cap body length separating the upper and lower terminal ends of the cap body, and with an outer surface and with an inner surface defining a threaded coupling configuration surrounding the inner surface of the outer sidewall and selectively removably coupled to the threaded configuration defined by the handheld adhesive sealant tube. The improvement also includes a sealant discharge conduit coupled to the cap body, with a lower terminal conduit end defining a lower conduit opening, an upper terminal conduit end opposing the lower terminal conduit end and defining an upper conduit opening, a conduit length separating the lower terminal conduit end and the upper terminal conduit end, with a conduit inner surface defining a conduit channel spanning the conduit length, with a conduit outer surface opposing the conduit inner surface and defining, with the inner surface of the cap body, and a tube receiving channel surrounding the sealant discharge conduit with the upper end of the handheld adhesive sealant tube disposed therein, wherein the lower terminal conduit end is disposed within the enclosed tube cavity and below the upper end of the handheld adhesive sealant tube and the upper terminal conduit end is spatially offset a length above the upper terminal end of the cap body and above the upper end of the handheld adhesive sealant tube.

In accordance with a further feature of the present invention, the receiving channel spans along the cap body length from the lower opening of the cap body to an internal wall disposed within the cap body.

Although the invention is illustrated and described herein as embodied in an adhesive sealant discharge cap for handheld adhesive sealant tubes, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the discharge conduit or adhesive sealant tube.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
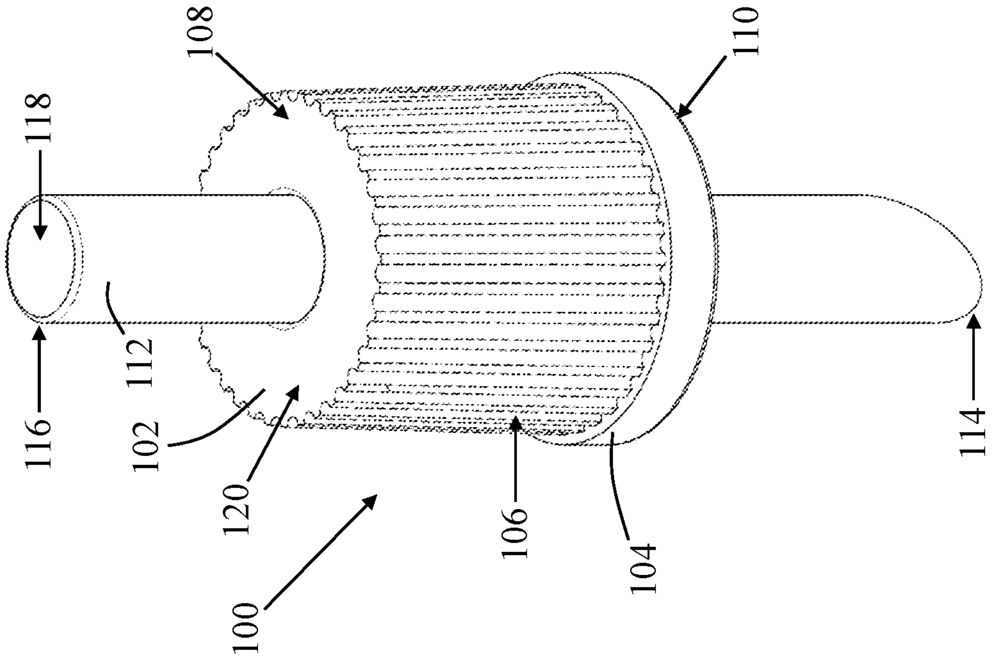
FIG. 1 is a perspective view of a selectively removable cap for handheld silicone adhesive sealant tubes in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient adhesive sealant discharge cap for handheld adhesive sealant tubes that enables an adhesive sealant tube to be utilized repeatedly after initial use and inhibits curing of the adhesive sealant near or at the upper end of the sealant tube where the adhesive sealant is configured to be discharged.

Referring now to FIG. 1, one embodiment of the present invention is shown in perspective view, wherein FIG. 1, along with other figures, show several advantageous features of the present invention, but, as will be described below, the invention can be provided in several shapes, sizes, combinations of features and components, and varying numbers and functions of the components. The first example of a sealant discharge cap 100 for handheld adhesive sealant tubes, as shown in FIG. 1, includes a cap body 102 and a sealant discharge conduit 112 configured to extend within the handheld adhesive sealant tube.

Figure 3:
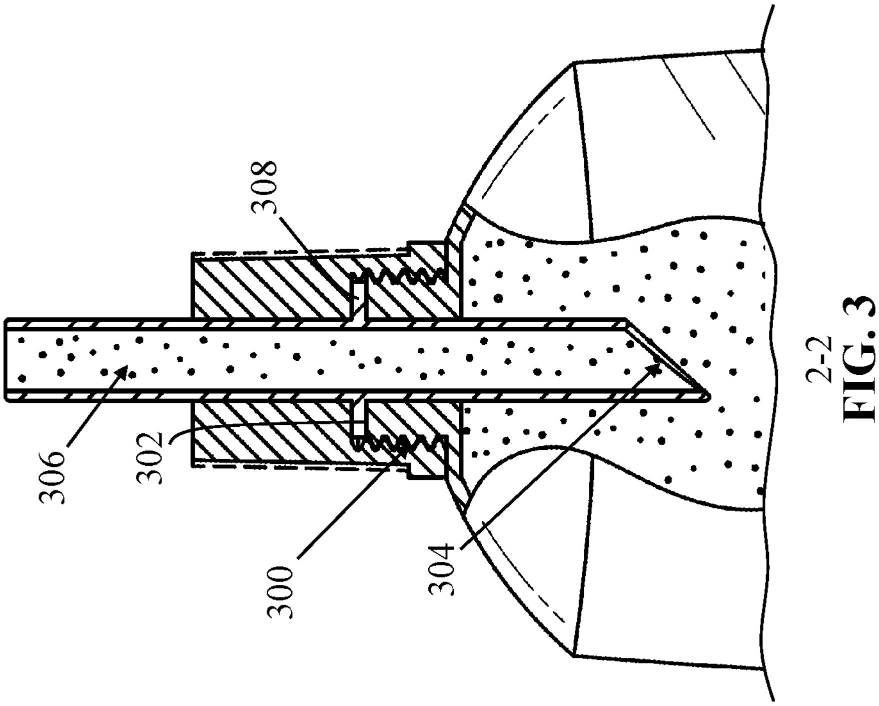
FIG. 3 is a close-up view of section 2-2 in FIG. 2.
Figure 2:
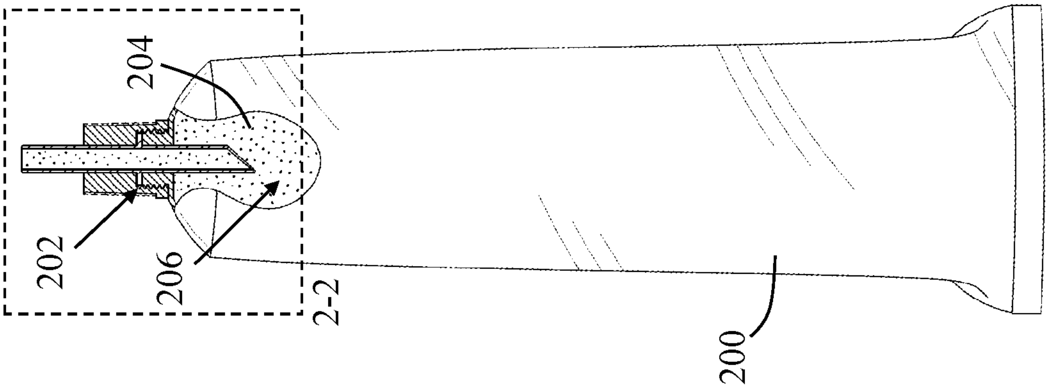
FIG. 2 is an elevational view of the selectively removable cap coupled to the top of a handheld silicone adhesive sealant tube in accordance with one embodiment of the present invention.

With reference to FIGS. 2-3 in combination with FIG. 1, the sealant discharge cap 100 can be selectively removably coupled to an exemplary handheld adhesive sealant tube 200 operably configured to house an adhesive sealant 204 within an enclosed tube cavity 206 defined by the handheld adhesive sealant tube 200. As those of skill in the art will appreciate, these handheld adhesive sealant tubes 200 are configured to be grasped by a user (with at least one hand) and are initially packaged to hermetically seal the adhesive sealant 204 therein. The adhesive sealant tube 200 has an upper end 202 defining a tube opening 204 for discharging the adhesive sealant 204 when there are no external attachments or caps coupled thereto. The adhesive sealant tube 200 also defines a threaded configuration proximal to the upper end 202 of the handheld silicone adhesive sealant tube 200, wherein "proximal" is defined as being at or near (within 5% of the overall length of the tube 200) the upper end 202.

More specifically, the cap body 102 can be seen having an outer sidewall 104 with an upper terminal end 108, a lower terminal end 110 opposing the upper terminal end 108 and defining a lower opening 900, and a cap body length separating the upper and lower terminal ends 108, 110 of the cap body 102. As used herein, the term "wall" is intended broadly to encompass continuous structures, as well as, separate structures that are coupled together so as to form a substantially continuous external surface. The cap body length may be approximately 20-30 mm. The cap body 102, along with the sealant discharge conduit 112, may be beneficially of a substantially rigid polymeric material, such as polypropylene, polyethylene, ABS plastic, or nylon. The cap body 102 and sealant discharge conduit 112 may also be beneficially manufactured using an injection molding process. In one embodiment, the cap body 102 and the discharge conduit 112 are of a monolithic structure to ensure structural integrity during use. In other embodiments, the cap body 102 and the discharge conduit 112 may be formed with separate components and coupled together as a unitary structure through, for example, mechanical methods such as a threaded configuration or chemical methods such as adhesive or welding.

The cap body 102 can be seen having an upper surface 120 that may be substantially planar, wherein the cap body 102 may be formed with a bore and the upper surface 120 may defined an enclosed aperture for receiving the discharge conduit 112 therethrough. The cap body 102 also includes an outer surface 106 and an inner surface 300 opposing the outer surface 106 of the cap body 102, wherein the inner surface 300 defines a threaded coupling configuration completely or partially surrounding the inner surface 108 of the outer sidewall. The threaded coupling configuration may be threaded configuration like shown in the figures, but may also include other tongue-and-groove configurations or coupling configurations with a raised or protruding surface configured to restrict longitudinal movement of the cap body 102 relative to the upper end 202 of the adhesive sealant tube 200.

Figure 10:
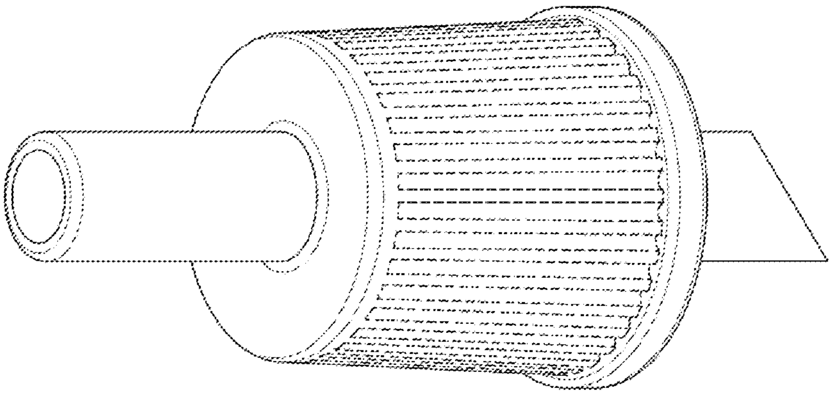
FIG. 10 is a perspective view of a selectively removable cap for handheld silicone adhesive sealant tubes in accordance with another embodiment of the present invention.

In one embodiment, the outer surface 106 includes a plurality of ridges radially extending the outer surface 106 of the outer sidewall 104 and configured to provide a gripping surface for a user. Said another way, the plurality of ridges (as shown in the figures) may be longitudinally oriented, parallel, and equally spaced (less than 5 mm) ridges (and corresponding recesses) that provide surfaces for the user to hold onto and apply sufficient torque to the cap body 102 in order to secure the cap body 102 to the adhesive sealant tube 200. Another embodiment of the cap body with an outer surface having a plurality of ridges or recesses can also be seen in FIG. 10.

Still referring to FIGS. 1-3, the sealant discharge conduit 112 is coupled to the cap body 102 by, for example, using injection molding methods or a threaded configuration. The sealant discharge conduit 112 also includes a lower terminal conduit end 114 defining a lower conduit opening 304 where adhesive sealant material enters and an upper terminal conduit end 116 opposing the lower terminal conduit end 114 and defining an upper conduit opening 118 where adhesive sealant material exits when desired by the user. The sealant discharge conduit 112 has a conduit length separating the lower and upper terminal conduit ends 114, 116 that may be approximately 25-75 mm, thereby providing a minimal length where, if any adhesive does cure inside the sealant discharge conduit 112, it can be forced out via pressure caused by depressing tube 200. The sealant discharge conduit 112 also includes a conduit inner surface defining a conduit channel 306 spanning the conduit length and a conduit outer surface opposing the conduit inner surface. The conduit inner and outer surfaces may be smooth and the discharge conduit 112 may be of cylindrical shape configured to facilitate in the transportation of adhesive sealant material.

Figure 9:
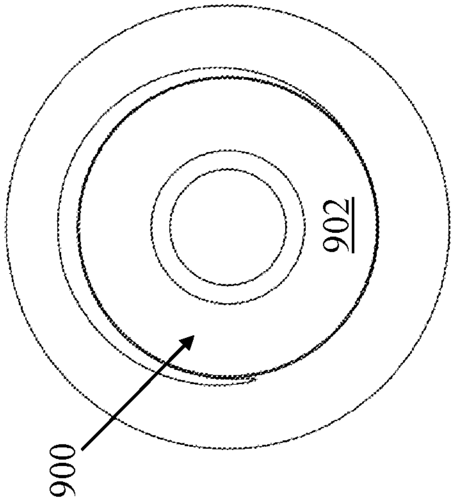
FIG. 9 is a bottom plan view of the selectively removable cap section in FIG. 1.
Figure 8:
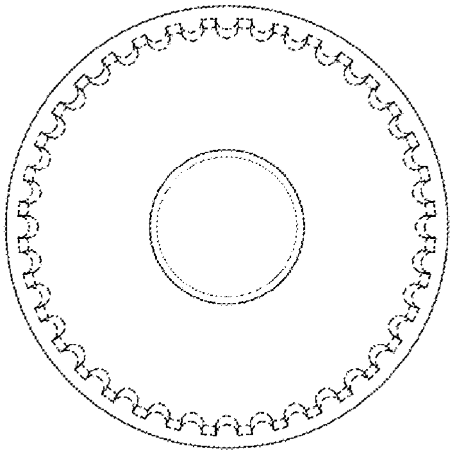
FIG. 8 is a top plan view of the selectively removable cap section in FIG. 1.

As best seen in FIGS. 2-3 and FIG. 9, the conduit outer surface and inner surface 108 of the cap body 102 both define a tube receiving channel 902 surrounding the sealant discharge conduit 112 and where the upper end 202 of the handheld adhesive sealant tube 200 is disposed when the cap body 102 is coupled to the sealant container 200. The tube receiving channel 902 may be cylindrical and may also span along the cap body length, from at least the lower opening 900 of the cap body 102 to an internal wall 302 disposed within the cap body 102. In one embodiment, the internal wall 302 is defined by a flange 308 radially extending outwardly from the conduit outer surface of the sealant discharge conduit 112. In other embodiments the upper wall 302 may be defined internally by the cap body 102 and otherwise acts as a barrier or movement barrier for the upper end 202 of the sealant tube 200. Said another way, the internal wall 302 may define an internal inner limit of the tube receiving channel 902. The flange 308 may continuously span around the conduit outer surface and may directly couple with the inner surface 300 of the cap body 102 to restrict movement of the sealant tube 200. The flange 308 may also be threadedly coupled to the threaded coupling configuration defined by the inner surface 300 of the cap body 102 to beneficially secure the sealant discharge conduit 112 to the cap body 102. The flange 308 may be a thin disc of thickness less than approximately 15 mm. The flange 308 and internal wall configuration of the cap body 102 may be shaped and sized to conform to one another, thereby providing a tight-spaced coupling configuration.

Figure 5:
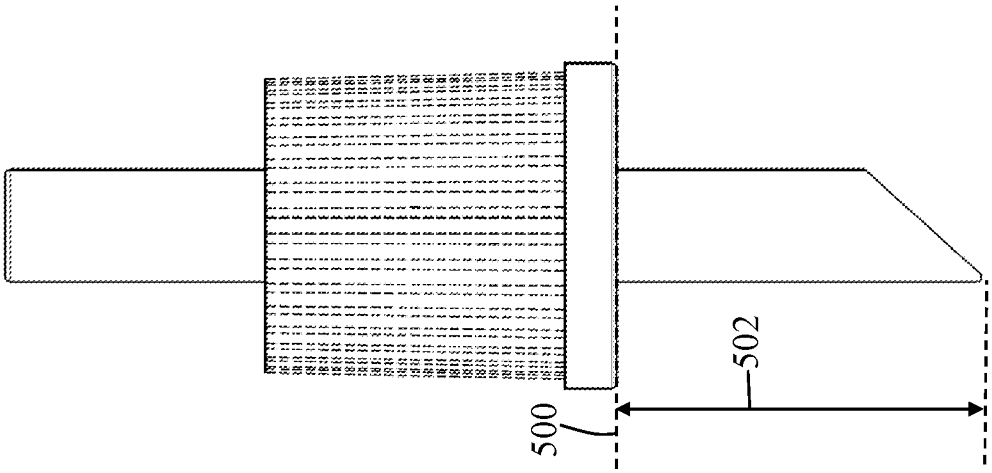
FIG. 5 is an elevational right-side view of the selectively removable cap section in FIG. 1.
Figure 4:
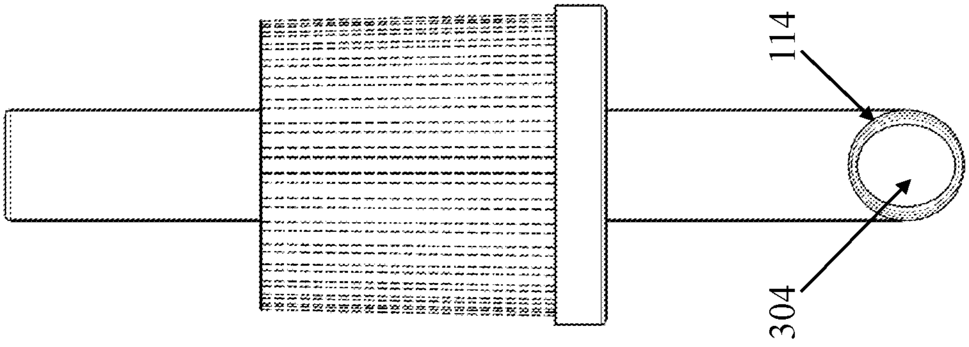
FIG. 4 is an elevational front view of the selectively removable cap section in FIG. 1.
Figure 7:
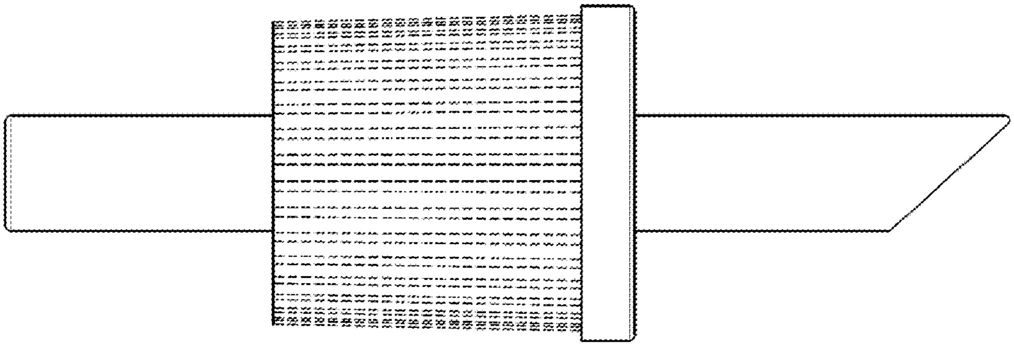
FIG. 7 is an elevational rear view of the selectively removable cap section in FIG. 1.
Figure 6:
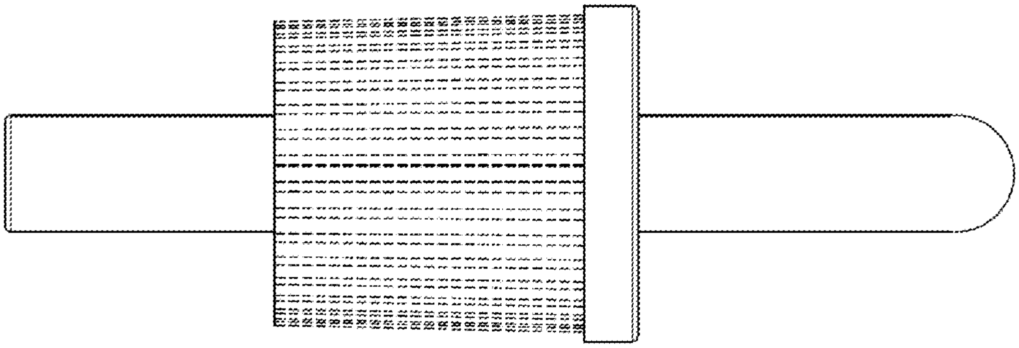
FIG. 6 is an elevational left-side view of the selectively removable cap section in FIG. 1.

Beneficially and with reference to FIGS. 1-3 in combination with FIG. 5, the lower terminal conduit end 114 is spatially offset a length 502 (e.g., approximately 10-50 mm) below the lower terminal end 110 of the cap body 102 and the upper terminal conduit end 116 spatially offset a length (e.g., approximately 10-50 mm) above the upper terminal end 108 of the cap body 102. Said another way, the lower terminal conduit end 114 may be located below the lower rim portion or skirt of the cap body 102 that surrounds sealant tube 200 to beneficially prevent any cured adhesive around the upper end 202 of the tube 200 from preventing the tube 200 from operating as intended. The upper terminal conduit end 116 may be located above the substantially planar upper surface 120 to enable the sealant material to be effective discharged from the tube 200 to a target surface. Said another way, the lower terminal conduit end 114 is disposed within the enclosed tube cavity 206 and below the upper end 202 of the handheld adhesive sealant tube 200 and the upper terminal conduit end 116 is spatially offset a length above the upper terminal end 108 of the cap body 102 and above the upper end 202 of the handheld adhesive sealant tube 200. The lower terminal conduit end 114 does not extend too far below the lower rim portion or skirt of the cap body 102 (i.e., a length 502 less than 75 mm) so as to not puncture the sealant tube and enable a substantial amount of the adhesive material to be squeezed out of the tube 200.

In one embodiment, the sealant discharge conduit 112 tapers in diameter (or be angled to a point) proximal to the lower terminal tube end 114 to facilitate in puncturing a seal on the adhesive sealant tube 200 and/or any cured adhesive material located proximal to the upper end 202 of the tube 200. The conduit channel 306 may be approximately 2-20 mm, but is preferably around 4 mm, in diameter. In one embodiment, at least 10% of the conduit length is spatially offset a length below the lower terminal end 110 of the cap body 102 and at least 10% of the conduit length is spatially offset a length above the upper terminal end 108 of the cap body 102, thereby providing an effective and efficient cap assembly for discharging adhesive sealant material. Described differently, the lower terminal end 110 of the cap body 102 may define a lower cap plane 500, wherein the sealant discharge conduit 112 is oriented at a perpendicular angle relative to the lower cap plane 500 and extends 5-25 mm in length below the lower terminal end 110 of the cap body 102. As such, when desired for use, the user will remove the original cap on the sealant tube 200, insert the sealant discharge conduit 112 into the tube 200, and, in most embodiments, screw the cap body 102 onto the threads used for the original cap until reaching the internal wall 302. The cap body 102 will be removed in opposite fashion.

It should be understood that terms such as, “front,” “rear,” “side,” top,” “bottom,” and the like are indicated from the reference point of viewing the adhesive discharge cap 100 shown in the figures, but change relative to the perspective. Although a specific order of executing process and use steps has been disclosed herein, the order of executing the steps may be changed relative to the order shown in certain embodiments. Also, two or more steps described or shown as occurring in succession may be executed concurrently or with partial concurrence in some embodiments. Certain steps may also be omitted for the sake of brevity. In some embodiments, some or all of the process steps can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. An adhesive discharge cap for handheld adhesive sealant tubes comprising:

a cap body having an outer sidewall with:

an upper terminal end, a lower terminal end opposing the upper terminal end and defining a lower opening;

a cap body length separating the upper and lower terminal ends of the cap body; and an outer surface and an inner surface defining a threaded coupling configuration surrounding the inner surface of the outer sidewall; and a sealant discharge conduit coupled to the cap body, with a lower terminal conduit end defining a lower conduit opening, an upper terminal conduit end opposing the lower terminal conduit end and defining an upper conduit opening, a conduit length separating the lower terminal conduit end and the upper terminal conduit end, with a conduit inner surface defining a conduit channel spanning the conduit length, with a conduit outer surface opposing the conduit inner surface and defining, with the inner surface of the cap body, and a tube receiving channel surrounding the sealant discharge conduit and spanning along the cap body length from the lower opening of the cap body to an internal wall disposed within the cap body, wherein the lower terminal conduit end is spatially offset a length between approximately 10-50 mm below the lower terminal end of the cap body with the entire lower conduit opening disposed below the lower terminal end of the cap body and the upper terminal conduit end spatially offset a length above the upper terminal end of the cap body, wherein the cap body and the discharge conduit are of a monolithic structure.

2. The adhesive discharge cap for handheld adhesive sealant tubes according to claim 1, wherein the outer surface further comprises:

a plurality of ridges radially extending the outer surface of the outer sidewall and configured to provide a gripping surface for a user.

3. The adhesive discharge cap for handheld adhesive sealant tubes according to claim 1, wherein the sealant discharge conduit tapers in diameter proximal to the lower terminal tube end.

4. The adhesive discharge cap for handheld adhesive sealant tubes according to claim 1, wherein the cap body and the sealant discharge conduit are of a polymeric material including at least one of polypropylene, polyethylene, ABS plastic, or nylon.

5. The adhesive discharge cap for handheld adhesive sealant tubes according to claim 1, wherein at least 10% of the conduit length is spatially offset a length below the lower terminal end of the cap body and at least 10% of the conduit length is spatially offset a length above the upper terminal end of the cap body.

6. The adhesive discharge cap for handheld adhesive sealant tubes according to claim 1, wherein the lower terminal end of the cap body defines a lower cap plane, the sealant discharge conduit oriented at a perpendicular angle relative to the lower cap plane.

7. The adhesive discharge cap for handheld adhesive sealant tubes according to claim 1, wherein the sealant discharge conduit further comprises a flange radially extending outwardly from the conduit outer surface, directly coupled with the inner surface of the cap body, and defining the internal wall defining an internal inner limit of the tube receiving channel.

8. The adhesive discharge cap for handheld adhesive sealant tubes according to claim 7, wherein the flange is threadedly coupled to the threaded coupling configuration defined by the inner surface of the cap body.

9. In combination with a handheld adhesive sealant tube operably configured to house an adhesive sealant within an enclosed tube cavity defined by the handheld adhesive sealant tube, having an upper end defining a tube opening for discharging the adhesive sealant, and defining a threaded configuration proximal to the upper end of the upper end of the handheld silicone adhesive sealant tube, the improvement comprising:

a cap body having an outer sidewall with an upper terminal end, with a lower terminal end opposing the upper terminal end and defining a lower opening, with a cap body length separating the upper and lower terminal ends of the cap body, and with an outer surface and with an inner surface defining a threaded coupling configuration surrounding the inner surface of the outer sidewall and selectively removably coupled to the threaded configuration defined by the handheld adhesive sealant tube; and a sealant discharge conduit coupled to the cap body, with a lower terminal conduit end defining a lower conduit opening, an upper terminal conduit end opposing the lower terminal conduit end and defining an upper conduit opening, a conduit length separating the lower terminal conduit end and the upper terminal conduit end, with a conduit inner surface defining a conduit channel spanning the conduit length, with a conduit outer surface opposing the conduit inner surface and defining, with the inner surface of the cap body, and a tube receiving channel surrounding the sealant discharge conduit with the upper end of the handheld adhesive sealant tube disposed therein, wherein the lower terminal conduit end is disposed within the enclosed tube cavity with the entire lower conduit opening disposed below the lower terminal end of the cap body, spatially offset a length between approximately 10-50 mm below the lower terminal end of the cap body, and below the upper end of the handheld adhesive sealant tube and the upper terminal conduit end is spatially offset a length above the upper terminal end of the cap body and above the upper end of the handheld adhesive sealant tube, wherein the cap body and the discharge conduit are of a monolithic structure.

10. The improvement according to claim 9, wherein the receiving channel spans along the cap body length from the lower opening of the cap body to an internal wall disposed within the cap body.

11. The improvement according to claim 9, wherein the outer surface further comprises:

a plurality of ridges radially extending the outer surface of the outer sidewall and configured to provide a gripping surface for a user.

12. The improvement according to claim 9, wherein the sealant discharge conduit tapers in diameter proximal to the lower terminal tube end.

13. The improvement according to claim 9, wherein at least 10% of the conduit length is spatially offset a length below the lower terminal end of the cap body and at least 10% of the conduit length is spatially offset a length above the upper terminal end of the cap body.

14. The improvement according to claim 9, wherein the lower terminal end of the cap body defines a lower cap plane, the sealant discharge conduit oriented at a perpendicular angle relative to the lower cap plane.

15. The improvement according to claim 9, wherein the sealant discharge conduit further comprises a flange radially extending outwardly from the conduit outer surface, directly coupled with the inner surface of the cap body, and defining the internal wall defining an internal inner limit of the tube receiving channel.

16. The improvement according to claim 15, wherein the flange is threadedly coupled to the threaded coupling configuration defined by the inner surface of the cap body.

* * * * *